A. NOBEL.
SUBSTITUTE FOR GUNPOWDER.

No. 50,617. Patented Oct. 24, 1865.

Witnesses.
Wm Albert Steel.
John Parker

Inventor.
A. Nobel
By his atty
J. H. Howson

UNITED STATES PATENT OFFICE.

ALFRED NOBEL, OF HAMBURG.

IMPROVED SUBSTITUTE FOR GUNPOWDER.

Specification forming part of Letters Patent No. 50,617, dated October 24, 1865.

*To all whom it may concern:*

Be it known that I, ALFRED NOBEL, of the city of Hamburg, have invented the Use of Nitro-Glycerine or Analogous Substances as a Substitute for Gunpowder; and I do hereby declare the following to be a full, clear, and exact description of the same, reference being had to the accompanying drawings, and to the letters of reference marked thereon.

My invention consists in the use, as a substitute for gunpowder, of nito-glycerine or its equivalent, substantially in the manner described hereinafter, so that the said liquid, which, when exposed, cannot be wholly decomposed and exploded, shall by confinement be subjected to heat and pressure, by which its total and immediate decomposition and explosion is effected.

In order to enable others to make and use my invention, I will now proceed to describe the method of carrying it into effect.

Figure 1:
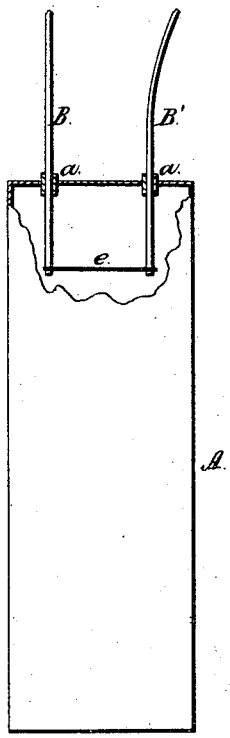
Figure 2:
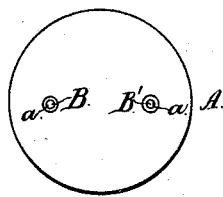

On reference to the accompanying drawings, which form a part of this specification, Figure 1 is a view, partly in section, of one apparatus by means of which I render nitro-glycerine or its equivalent available as a substitute for gunpowder, and Fig. 2 a plan view.

There is a class of explosive substances, comprising nitro-glycerine, the nitrates of ethel and methyl, and nitro-mannite, which have long been known, but have never been practically applied as explosive agents. When a flame is applied to gunpowder or gun-cotton the whole mass is instantaneously decomposed, this sudden decomposition taking place both when the substance is unconfined and when it is ignited under pressure. On the application of heat or flame to nitro-glycerine or other of the liquids above mentioned, when the latter is unconfined, only that portion of the liquid is decomposed which is directly acted on by the heat or flame, so that it is practically impossible to instantaneously explode the entire mass; hence, under ordinary circumstances, such substances cannot be looked upon as explosive agents. I have found, however, that when glycerine, mannite, or other of the materials mentioned is confined and a portion of the same is heated to decomposition the gases evolved are at such an intense heat and subject the material to such an excessive pressure that the whole mass is decomposed almost instantaneously. The chief point in my invention consists in overcoming the difficulty of suddenly igniting the entire mass of the materials mentioned, so that the same can be practically used as explosive agents.

The nitro-glycerine is first prepared by adding glycerine to a mixture of sulphuric and nitric acids, the addition not being made drop by drop, as in the usual manner, but the glycerine and acids being poured together into a funnel, and being discharged from the same into a body of cold water, the nitro-glycerine, being insoluble, quickly separating from the water, which is maintained at a low temperature by any suitable means.

When nitric acid of a high specific gravity is used, the temperature is much increased by reaction. It is therefore better to introduce the nitric acid and glycerine gradually into the sulphuric acid, allowing the mixture to cool between each operation.

If the material is to be used for blasting, it may be poured directly into the opening drilled in the rock, the opening above the liquid being closed in any suitable manner. For other purposes, however, the material can be best used when confined in cases. The material when thus confined may be exploded—

First. By exploding a quantity of gunpowder or other substance in contact with the liquid (the powder being confined in a waterproof tube or case) the heated gases evolved from the powder, being distributed throughout the mass of the liquid, raise the temperature of the latter sufficiently to decompose the same. When powder is used for this purpose, the case containing it may be immersed in the liquid, the powder being ignited by means of a fuse or by an electric spark. If desirable, however, the liquid may be placed in a tube and inserted in a mass of powder, which is then ignited in any suitable manner.

Secondly. By an electric spark or by passing a powerful current of electricity through a fine wire immersed in the liquid. An apparatus for thus effecting the explosion of the fluid is shown in the accompanying drawings, A being the case containing the fluid, B B' two wires which pass through glass tube a a, or through other insulating substance into the interior of the case, and c a fine platina wire, which connects the ends of the wires B B' together within the case. The platina wire is heated by an electric current, the material in contact with the wire being thus decomposed, and the remaining portion subjected to the heat and pressure necessary to instantaneously decompose the whole mass, as already described.

Thirdly. By inserting in the liquid a thin case containing lime and water, or any substances which, in combining, evolve heat.

Fourthly. By a fuse. This will do in a closed space, and under sufficient pressure, but if the gases of the decomposed liquid are enabled to escape before they accumulate to such a pressure as to effect the requisite impulses of explosion, the liquid is decomposed but slowly, and the fire expires before the whole mass is consumed.

I claim as my invention, and desire to secure by Letters Patent—

The use of nitro-glycerine or its equivalent, substantially in the manner and for the purpose described.

ALFRED NOBEL.

In presence of—
  F. P. VOHME,
  A. D. RITTER.